United States Patent
Smallwood et al.

[11] Patent Number: 6,018,518
[45] Date of Patent: Jan. 25, 2000

[54] FLOW CONTROL IN A CELL SWITCHED COMMUNICATION SYSTEM

[75] Inventors: Mark Alexander Leith Smallwood, Bucks; Michael Joseph Clarke, Oxford, both of United Kingdom

[73] Assignee: Madge Networks Limited, Buckinghamshire, United Kingdom

[21] Appl. No.: 08/782,632

[22] Filed: Jan. 10, 1997

[30] Foreign Application Priority Data

Feb. 1, 1996 [GB] United Kingdom ............ 9602027

[51] Int. Cl.[7] ........................... H04J 1/16; H04L 12/26
[52] U.S. Cl. ........................ 370/235; 370/236; 370/468
[58] Field of Search ................................ 370/230, 231, 370/235, 236, 465, 468, 395, 397

[56] References Cited

U.S. PATENT DOCUMENTS

| | | | |
|---|---|---|---|
| 5,497,375 | 3/1996 | Hluchyj et al. | 370/94.1 |
| 5,515,359 | 5/1996 | Zheng | 370/230 |
| 5,566,175 | 10/1996 | Davis | 370/84 |
| 5,633,859 | 5/1997 | Jain et al. | 370/234 |
| 5,701,292 | 12/1997 | Chiussi et al. | 370/232 |
| 5,737,313 | 4/1998 | Kolarov et al. | 370/234 |
| 5,745,477 | 4/1998 | Zheng et al. | 370/230 |
| 5,745,486 | 4/1998 | Beshai et al. | 370/352 |
| 5,748,901 | 5/1998 | Afek et al. | 395/200.68 |
| 5,771,231 | 6/1998 | Watanabe | 370/377 |

FOREIGN PATENT DOCUMENTS

| | | |
|---|---|---|
| 0 629 100 A1 | 12/1994 | European Pat. Off. |
| WO 91/00662 | 1/1991 | WIPO |
| WO 94/16511 | 7/1994 | WIPO |

*Primary Examiner*—Ajit Patel
*Attorney, Agent, or Firm*—Sughrue, Mion, Zinn, Macpeak & Seas, PLLC

[57] ABSTRACT

In a cell switched communication system in which a source is connected to a network for transmission of cells to a network destination via a network element having a plurality of ports, said source generating resource cells containing information concerning a bandwidth allocated to the source for transmitting cells, a method of providing flow control at the network element comprises the steps of: (a) detecting a resource cell as it is received at an input port of the network element; (b) routing the resource cell to a resource cell processing means common to all the ports of the network element; (c) modifying information contained in the resource cell concerning the bandwidth allocation for the source on the basis of a determination of current utilisation of ports of the network element; and, (d) passing the modified resource cell to an output port of the network element for subsequent return to the source. Resource management (RM) cells received at an input port of a network element in an ATM communication system are routed to a centralised resource cell processing means where information in the resource cell relating to the bandwidth allocation of the source is modified to take account of the available bandwidth. The RM cell is subsequently passed back to the source to enable the source to modify its transmission rate to correspond to the modified allocated bandwidth for that source and thereby ensure that cells are not discarded by the network element due to traffic congestion.

7 Claims, 3 Drawing Sheets

| FIELD | PAYLOAD OCTET | BIT(S) | DESCRIPTION |
|---|---|---|---|
| ID | 1 | ALL | PROTOCOL ID |
| DIR | 2 | 8 | DIRECTION (0=fwds; 1=bwds) |
| BN | 2 | 7 | BECN BIT |
| CI | 2 | 6 | CONGESTION INDICATION BIT |
| NI | 2 | 5 | NO INCREASE BIT |
| RA | 2 | 4 | REQUEST / ACKNOWLEDGE BIT |
| ER | 3-4 | ALL | EXPLICIT RATE |
| CCR (ACR) | 5-6 | ALL | CURRENT (AVAILABLE) CELL RATE |
| MCR | 7-8 | ALL | MINIMUM CELL RATE |
| RESERVED | 9-46 | ALL | RESERVED |
| RESERVED | 47 | 16-11 | |
| CRC-10 | 47-48 | 10-1 | |

FLOW CONTROL IN A CELL SWITCHED COMMUNICATION SYSTEM

This invention relates to a method and apparatus to provide flow control in a cell switched communication system.

Asynchronous Transfer Mode (ATM) is one such cell switched communication system. ATM is a transmission procedure based on asynchronous time division multiplexing using fixed-length data packets. These data packets are known as cells. Each cell has a length of 53 bytes, of which 5 bytes are reserved for a header. All nodes on a network are connected via one or more ATM switches, which route the cells to their various destinations.

The Available Bit Rate (ABR) service is a flow control mechanism for traffic congestion control in an ATM network. The network provides dynamic feedback to the source of each Virtual Channel (VC) according to the bandwidth available to that VC.

Under standards being developed by the ATM Forum, ABR flow control is based on the use of Resource Management (RM) cells. These RM cells contain information relating to the allowed transmission rate of cells for a specific VC. The RM cells are inserted into an ATM cell stream at regular intervals and on reaching the required destination node, the RM cells are passed back to the source node. The ATM switches modify the RM cells so that the returned RM cells contain available bandwidth information. On receipt of the returned RM cells, the cell rate of the source node can be adjusted accordingly to ensure that no cells will be discarded by the ATM switches due to traffic congestion.

The RM cell structure is shown in FIG. 1. The RM cell includes a Direction Indication (DIR) field which indicates whether the RM cell is travelling in a forward direction i.e. towards the destination network node, or a backwards direction i.e. towards the source network node; an Explicit Rate (ER) field which is modified by the switch to control the cell rate of the source node; and, an Allowed Cell Rate (ACR) field which indicates the current allowed cell rate of the source network node.

According to a first aspect of the present invention, in a cell switched communication system in which a source is connected to a network for transmission of cells to a network destination via a network element having a plurality of ports, said source generating resource cells containing information concerning a bandwidth allocated to the source for transmitting cells, a method of providing flow control at the network element comprises the steps of:

(a) detecting a resource cell as it is received at an input port of the network element;

(b) routing the resource cell to a resource cell processing means common to all the ports of the network element;

(c) modifying information contained in the resource cell concerning the bandwidth allocation for the source on the basis of a determination of current utilisation of ports of the network element; and, (d) passing the modified resource cell to an output port of the network element for subsequent return to the source.

According to a second aspect of the present invention, a network element having a plurality of ports for use in a cell switched communication system in which a source is connected to a network for transmission of cells to a network destination via the network element, said source generating resource cells containing information concerning a bandwidth allocated to the source for transmitting cells, comprises:

means for detecting a resource cell transmitted within a stream of cells received at an input port of the network element;

resource cell processing means common to all the ports of the network element;

means for routing the resource cells from the input port to the resource cell processing means; and, means for passing the resource cells from the resource cell processing means to an output port of the network element for subsequent return to the source, wherein the resource cell processing means includes means for modifying information contained in the resource cell specifying bandwidth allocation for the source on the basis of a determination of current utilisation of ports of the network element.

In the present invention, resource cells received at an input port of a network element in a cell switched communication system are routed to a centralised resource cell processing means where information in the resource cell relating to the bandwidth allocation of the source is modified to take account of the available bandwidth. The resource cell is subsequently passed back to the source to enable the source to modify its transmission rate to correspond to the modified allocated bandwidth for that source and thereby ensure that cells are not discarded by the network element due to traffic congestion.

The resource cells may be modified en route to the network destination i.e. in the forward direction, but preferably, the resource cells are only modified by the network element as the resource cells are returned by the network destination via the network element i.e. in the backward direction, to the source. Alternatively, the resource cells may be modified in both directions.

The advantage of having only a single resource cell processing means common to all the ports of the network element is that bandwidth optimisation is increased and the cost of implementing the system in the network element is reduced substantially. In addition, it facilitates providing flow control in a network element not originally designed to provide this functionality.

Preferably, the network element is a switch.

One proposed use of the present invention is in an ATM network utilising the ATM Forum specified ABR flow control scheme. Accordingly, preferably the cell switched communication system is an ATM network, where the cells are ATM cells, and in particular the resource cells are RM cells. Preferably, the network element is an ATM switch. An example of an ATM switch is described in our co-pending British patent application number 9520686.8, filed on Oct. 10th, 1995. In the context of an ATM switch, all RM cells received at switch fabric ports are detected and re-routed to a resource cell processor. As part of the function of an input module of the switch, the header of cells received at each port, including RM cells, are checked for errors, Virtual Path Identifier (VPI) and Virtual Channel Identifier (VCI) values are validated, and the destination output port is determined. The cells are prepended with an internal routing tag which includes information relating to the destination output port and a cell delay priority.

Once an RM cell has been detected within a stream of cells received at a switch port, preferably the delay priority in the internal routing tag is reset at a higher level and the destination output port modified to correspond to a reserved output port of the switch fabric connected to the resource cell processor, whilst retaining the original information in the internal routing tag relating to the input port and destination output port. The cell is then routed to the reserved port of the switch fabric and delivered to the resource cell processor. In the preferred embodiment of the present invention, in the forward direction, the resource cell processor merely extracts the ACR value for the RM cell and then the RM cell is returned to the reserved port of the switch fabric for re-routing to the destination output port. In the backward direction, the resource cell processor modifies the ER value in the RM cell and then returns the RM cell to the switch fabric for re-routing to the required destination output port.

Preferably, the resource cell processor monitors an output rate for each port of the switch fabric and an output buffer fill level for each output port. In the ATM switch described in our British patent application number 9520686.8, the output buffers comprise a shared memory which is logically divided according to traffic class and output port. The resource cell processor receives information on the output rate and fill level of each buffer in this shared memory and preferably, combines this information with the ACR values extracted from RM cells travelling in the forward direction to determine a modified ER value to be set in the ER field of RM cells travelling in the backward direction.

When the RM cells are received by the source, the modified ER value causes the source to alter its cell rate, which is reflected in a new ACR value in subsequent RM cells transmitted by the source.

According to a third aspect of the present invention, in a network element comprising a plurality of ports for use in a cell switched communication system of a type where network sources generate resource cells containing information relating to a bandwidth allocation for the source which may be modified by the network element and passed back to the source, a method of generating a bandwidth allocation variable for writing into the resource cells by the network element comprises the steps of:

(a) calculating a cell rate variable which is a function of an aggregate value of the bandwidths allocated to all active sources connected to the network element which are directing cell streams to one output port of the network element, the bandwidth allocation of the active sources being extracted from the resource cells; and, (b) determining an overload factor for said output port as a function of a rate of input of cells to said output port in relation to a desired rate of input of cells to said output port, wherein the bandwidth allocation variable for each active source is set as the cell rate variable multiplied by the overload factor.

According to a fourth aspect of the present invention, a network element comprising a plurality of ports for use in a cell switched communication system of the type where network sources generate resource cells containing information relating to a bandwidth allocation for the source which may be modified by the network element and passed back to the source, wherein the network element further comprises a computer programmed to generate a bandwidth allocation variable for writing into the resource cells in accordance with the method of the third aspect of the present invention.

Preferably, the first and second aspects of the present invention are combined with the third and fourth aspects, respectively. The third and fourth aspects of the present invention provide a means for determining an allocation of the bandwidth of the network element amongst active sources connected to the network element, and thereby produce a fast response to traffic congestion to minimize cell loss.

In the preferred implementation in an ATM switch, preferably, a modified ER value ERQ is calculated dynamically by a method comprising the following steps:

(a) determining a cell rate variable AACR using a mathematical function which takes an aggregate of the ACR values sampled from RM cells in one or more streams of ATM cells arriving at the switch fabric ports which are to be routed to a specific switch fabric output port; and, (b) determining an input rate $R_i$ to an ABR queue in the output buffer for the switch fabric output port, wherein, $$ERQ = AACR \times \frac{R_t}{R_i},$$

where $R_t$ is a target rate for the switch fabric output port which is less than or equal to a maximum cell rate for the output port.

Preferably, the maximum cell rate for a given output port is determined by subtracting a measure of the higher priority traffic utilizing the output port from a line cell rate of the output port.

Preferably, the target rate $R_t$ is dependent on the output buffer fill level, where a faster target rate is selected when the buffer fill level is below a predetermined level and a slower target rate is selected when the buffer fill level is above a predetermined level. Most preferably, a continuous function is used to generate the target rate value.

Preferably, the resource cell processor includes a means to filter the ACR values used to calculate AACR.

Preferably, the resource cell processor includes a means to limit the individual increase in ACR of a given VC to avoid excessive numbers of calls being sent by a source during start-up before feedback information is returned from the network. Most preferably, this is achieved by limiting increases in a source's rate by a fixed additive cell rate which is a function of a round trip time for an RM cell.

According to a fifth aspect of the present invention, in a network element comprising a plurality of ports for use in a cell switched communication system of the type where network sources generate resource cells containing information relating to a bandwidth allocation for the source which may be modified by the network element and passed back to the source, a method of determining whether the cell rate of a source is being controlled by the network element includes the step of determining whether the allowed cell rate of the source could have resulted from information relating to the bandwidth allocated to that source in resource cells previously modified by the network element.

In the preferred implementation in an ATM switch, this is achieved by maintaining two variables based on the maximum and minimum ERQ values which have recently been marked by the switch. Ideally, these variables would represent the maximum and minimum ERQ values marked over the round trip time of a given VC. In practice, this is not possible and therefore preferably, the maximum and minimum ERQ values are determined by dynamic filtering of ERQ values marked by the switch. ACR values which fall outside these maximum and minimum ERQ values are unlikely to have originated from controllable VCs and hence are not used in the AACR calculation of the fourth aspect of the present invention.

The present invention will now be described with reference to the accompanying drawings in which.

Figures 1, 2:
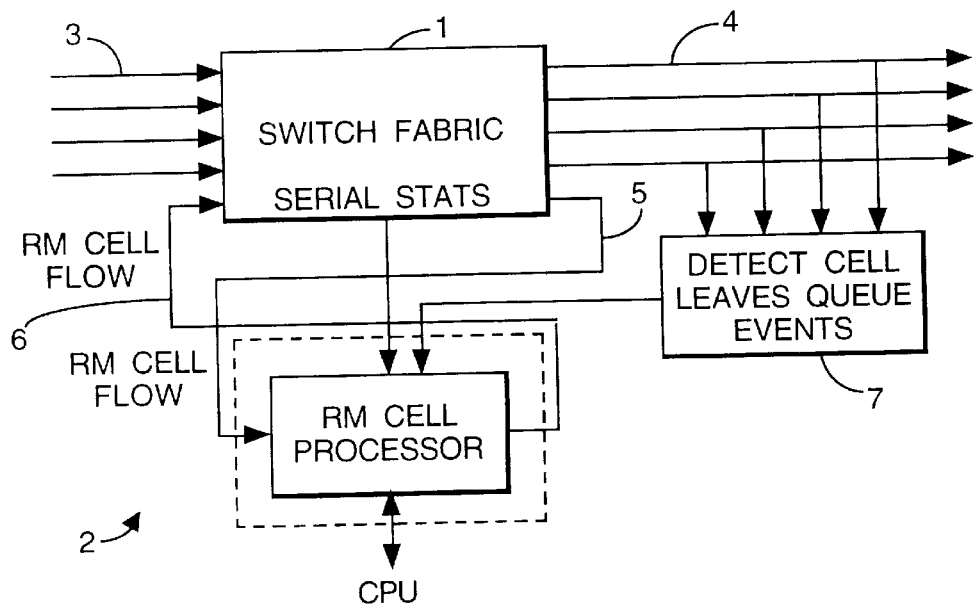
FIG. 1 shows the structure of an ATM Resource Management (RM) cell.
FIG. 2 shows a simplified block diagram of a switch fabric provided with an RM cell processor.

FIG. 2 shows a simplified block diagram of a switch fabric 1 provided with a resource management (RM) cell processor 2. The switch fabric 1 includes four input ports 3 associated with one of 4 line cards which receive streams of ATM cells from a number of sources (not shown). The ATM cells received at the switch fabric input ports 3 have already had their five byte headers examined, and an internal routing tag prepended. The internal routing tag includes information required to route the cells across the switch fabric to a particular destination output port 4. An example of an ATM switch fabric is described in detail in our co-pending British application number 9520686.8.

RM cells are detected by the line cards and routed to a reserved output port 5. The input port number is placed in the input port number identifier of the routing tag and the final destination port number is placed in a next route identifier of the routing tag.

The RM cell is then processed by the RM cell processor 2, according to whether the cell is a forward or backward RM cell. This is determined by examining the DIR field of the RM cell shown in FIG. 1.

The destination output port identifier in the internal routing tag is modified to correspond to the final destination port 4 as stored in the next route identifier in the routing tag. This avoids the need for the RM cell processor to look up the output port number based on the VC identifier in the cell header. Once an RM cell has been processed by the RM cell processor 2, it is returned to a reserved switch fabric input port 6.

As discussed in detail below, the switch fabric 1 includes a means 7 to monitor the performance of the output ports 4, and in particular, output port buffer fill levels, and pass this information to the RM cell processor 2.

Figure 3:
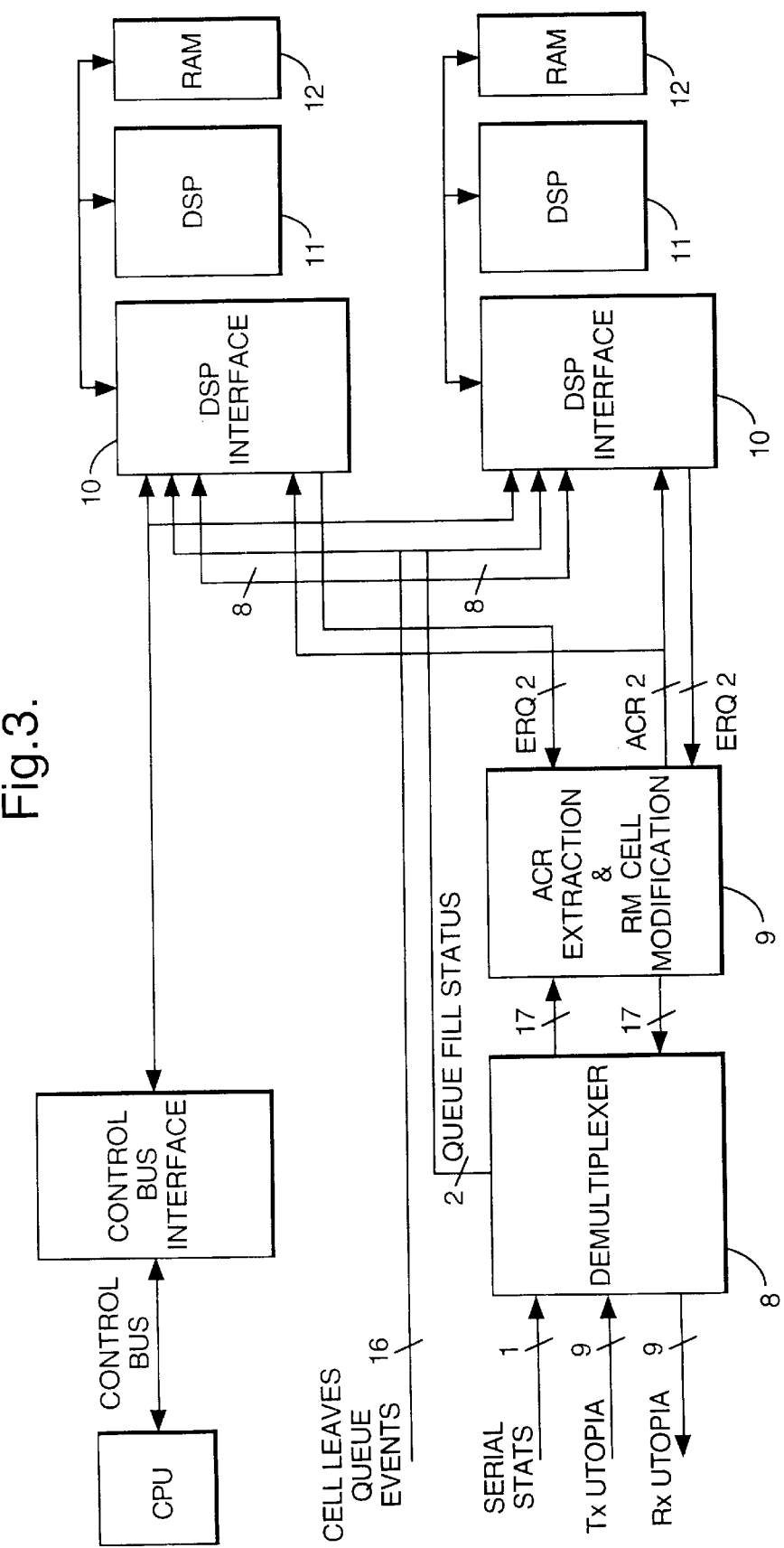
FIG. 3 shows an RM cell processor.

FIG. 3 shows an implementation of a complete RM cell processor. The architecture includes a multiplexer/demultiplexer block 8, an RM cell decoder/modifier 9, cell counters and DSP interfaces 10, and two DSP blocks 11.

The multiplexer/demultiplexer block 8 converts between the fast Utopia data stream used by the switch fabric 1 and the slower data stream used by the RM cell processor, and also partially decodes the serial statistics from the switch fabric 1, demultiplexing them into a 2-bit stream.

Figure 4:
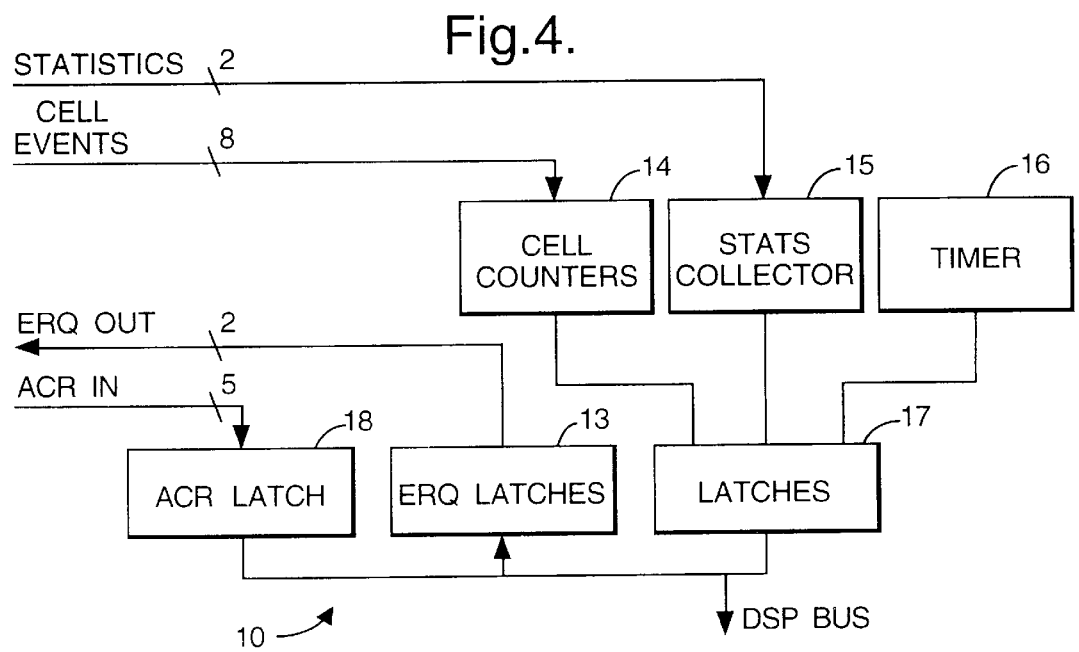
FIG. 4 shows functional elements used to gather data for flow control calculations; and, FIG. 5 shows a simplified example of an ATM communication system.

The RM cell decoder/modifier block 9 decodes and modifies RM cells, extracting the ACR value from the payload of forward RM cells and performing modification to the ER and NI fields of backward RM cells The cell counters and DSP interface blocks 10 shown in FIG. 4 use the ERQ latch 13 to transfer the required ER to be marked by the RM cell decoder/modifier 9 from the DSP. ACR values are collected by the ACR latch 18 from the RM cell decoder/modifier 9 via a 5-bit interface (one start bit, 4 data bits) and de-serialised. When a complete value is latched, a DSP interrupt is generated, and the DSP block 11 DMAs the data into its memory 12. The cell counters 14, statistics collection 15, timer 16 and associated latches 17 are used to create a time stamped switch state. This is used by the DSP to calculate the input rate to the ABR queue in the switch fabric by adding the difference in "cell leaves queue" count to the difference in queue fill level over a period timed using the cell period timer. To ensure that the input rate is correctly calculated, it is necessary to latch the cell leaves queue counts at exactly the same time that the given port is output on the serial statistics from the switch fabric. Each DSP 16 supports eight of the sixteen true switch ports, the selection of which is configurable.

An Explicit Rate algorithm used in the present invention to calculate the explicit rate will now be described in detail.

Definition of terms $R_i$ (Measured) input rate to the ABR queue

LCR Line cell rate, e.g. 353,200 cells/second for 155 Mbit/s

CVBW Sum of bandwidth used by CBR and VBR traffic sharing output port $R_0$ Available output rate from the ABR queue (=LCR−CVBW)

$Q_1$ Current ABR queue length $R_t$ Target input rate to queue. The buffer fill level controller lowers $R_t$ to force the buffer to empty after transients.

ERQ Explicit rate marked by the switch in the ER field of backwards RM cells passing through the input port of the contended output port AACR An intermediate variable which approaches the explicit rate which, if marked by the switch for all the active VCs, would maintain the current input rate to the ABR queue.

ACR Allowed Cell Rate of a given Virtual Channel (VC). The rate at which cells would be sent if the VC had a continuous stream of data to send. In an all ER switch environment, the ACR would usually be equal to the last ER marked by the switch.

TBE Transient buffer exposure. The number of ATM cells sent by a source at start-up before feedback is returned from the network. A desired TBE is determined by the size of the relevant buffers in a given switch.

RIF Rate Increase Factor, the maximum increase in rate allowed on reception of an RM cell RTT Maximum RM cell round trip time ICR Initial cell rate. This controls the TBE during the start-up of a source.

$ICR = TBE_{desired}/RTT$

RCR Real cell rate of a given VC. The RCR of a given VC is less than or equal to the current ACR of that VC.

$N_a$ Number of active sources

In the present invention, the explicit rate flow control algorithm is implemented by using dedicated hardware to measure and calculate $R_i$, $Q_1$, CVBW and AACR. and perform any control calculations in a DSP. The DSP reads the measured values from the hardware and calculates the ERQ for each output port.

The DSP control loop is either executed at a fixed rate or more quickly for a given port if the input rate to that port is very large. In general, the algorithm requires a very fast DSP control loop, typically recalculating ERQ for every 150 ATM cells entering the ABR queue.

The DSP uses the ACR values fed forward from the sources in order to eliminate the problems associated with the fact that the RTT to each source is variable and unknown. The ACR values are used to calculate an approximation to the average RCR of the active sources, AACR.

Given a set of sources with different RCRs causing an input rate to the switch queue, an idealised definition of AACR is the rate which, if adopted by all of the sources as their new RCR, would result in the same input rate to be experienced:

$$AACR = \frac{\sum_{n=1}^{N_a} RCR_n}{N_a}$$

If AACR is estimated, the number of active sources is given by:

$$N_a = \frac{R_i}{AACR}$$

The input rate to the switch queue can be scaled linearly by scaling AACR and using this as the ERQ. Hence measured overload can be corrected as follows:

$$ERQ = AACR \frac{R_t}{R_i}$$

and $$ER_{marked} = \text{MIN}(ER_{received}, ERQ)$$

where $ER_{marked}$ is the value that the switch is to place in the ER field of the RM cell. This value will be the lower of $ER_{received}$, the previous value of ER placed by the switch into the ER field, and ERQ.

This forms the fundamental method for the determination of ERQ in the algorithm.

One method used to estimate AACR is to calculate the mean of the received ACR values over a period of time:

$$AACR_k = \frac{\sum_{n=1}^{N} ACR_n}{N}$$

Clearly, this has a problem when N=0 and can be noisy for small N. This can be solved by including a weight of the previously calculated value in the mean. This has the effect of introducing some degree of smoothing to AACR:

$$AACR_k = \frac{\sum_{n=1}^{N} ACR_n + w \cdot ACCR_{k-1}}{N + w}$$

where w is a weighing factor.

The nature of realistic sources tends to lead to problems with calculating AACR. The assumption was made that low-rate sources would increase their output rates to use all the bandwidth allocated to them, i.e. behave as so-called persistent sources and adopt the ERQ being marked by the switch. This may not necessarily be the case. For example, the source may be locally congested or the ACR of the source may be being restricted by the ER being marked by another switch. The result is a low AACR value. This leads to a stable situation where the output is under-utilised. An equilibrium exists whereby the calculated AACR value cannot be increased by setting ERQ to AACR factored by the overload:

$$AACR_{measured} \approx AACR_{true} \cdot \frac{R_t}{R_i}$$

A second problem with AACR is seen with sources operating with high ICRs, as is common in LANs. When such sources go idle they retain their previous ACR. This can lead to AACR artificially increasing during start-ups. This causes an inappropriate rise in ERQ and results in extra queue fill.

The solution is to only count ACRs which fall within the bounds:

$$\text{MinERQ} * \text{MinERQ}_{safetyfactor} \leq ACR \leq \text{MaxERQ} * \text{MaxERQ}_{safetyfactor}$$

Ideally MinERQ and MaxERQ represent the minimum and maximum ERQ demanded over the last RTT, and, for example, $\text{MinERQ}_{safety\_factor}=0.8$ and $\text{MaxERQ}_{safety\_factor}=1.5$. MinERQ and MaxERQ can be updated as follows every DSP update:

$$\text{MinERQ}_k = \min(ERQ, \text{MinERQ}_{k-1} + (ERQ - \text{MinERQ}_{k-1}).\text{avf}_1)$$

$$\text{MaxERQ}_k = \max(ERQ, \text{MaxERQ}_{k-1} + (ERQ - \text{MaxERQ}_{k-1}).\text{avf}_2)$$

This uses Infinite Impulse Response (IIR) filtering to increase MinERQ and decrease MaxERQ towards the current ERQ if MinERQ and MaxERQ bound the current ERQ. The averaging parameters $\text{avf}_1$ and $\text{avf}_2$ must be selected according to the worst-case RTT of any source sharing the contended queue.

Hence AACR will only include ACRs which could have been the result of previous ERQs set by this switch. Note that in general setting MinERQ too low or MaxERQ to high only results in loss of utilisation or increased buffer fill.

However, it is possible for MinERQ and MaxERQ to permanently lose track of the "true" AACR when no VCs are controllable. It is necessary to count and sum the ACR values filtered out by the MinERQ and MaxERQ limits to detect such error conditions. $AACR_{min}$ (the mean of the ACRs below MinERQ) and $AACR_{max}$ (the mean of the ACRs above MaxERQ) are then calculated. The following conditional behaviours prevent the observed error conditions:

If more than two high ACRs were counted set MaxERQ= $AACR_{max}/\text{MaxERQ}_{safety\_factor}$.

Otherwise, if no ACRs were counted set MinERQ= $AACR_{min}/\text{MinERQ}_{safety\_factor}$ The algorithm uses the NI bit in the RM cell for bounding transient buffer exposure. This bit prevents sources from increasing their rate any further during congestion. It is set when either the measured input rate to the queue exceeds the output rate from the queue or the queue fill level is above a predetermined maximum. Hence it is guaranteed that the congestion experienced will not get any worse unless further VCs start up. This reduces further queue fill under some circumstances. This has the negative effect of introducing unfairness between different VCs for the duration of transients.

The final problem solved by the algorithm is seen when using a high RIF and trying to achieve fairness between sources by determining a single ER per queue, which sources will immediately adopt. The problem occurs when several idle VCs start up. They will begin to send cells at ICR before the first backward RM cell is received. The source then will adopt the ER received in the backwards RM cell. Many more cells could be sent at this explicit rate than were sent at ICR before the switch can again reduce the rates of the sources.

The solution proposed is to limit increases in the source rate at the switch over that required to correct for any under-utilisation.

$$ER_{marked} = \min(ER_{received}, ERQ, ACR_{VC} + RIF_{VC})$$

where $ACR_{VC}$ is the last received ACR on that VC (or, even better, a measure of the RCR of that VC) and $RIF_{VC}$ limits the TBE. This limitation of the transient buffer exposure is similar to that achieved by the use of ICR during the initial start-up of a VC.

Although this solution results in no loss in utilisation, it again has the effect of introducing unfairness between different VCs for the duration of transient. This is especially significant for VCs with larger RTTs which may take many iterations to ramp-up to their fair share of the bandwidth.

If buffer fill is experienced, it is necessary to target a lower input rate to quickly empty the buffer. Several approaches are possible. Targeting, for example, 75% utilisation when the buffer fill level exceeds a predetermined level has been seen to be successful. However, with mixed CBR, VBR and ABR traffic something more sophisticated may be required. The method chosen is to use a buffer fill level controller. The CBR and VBR output rates are measured and the target rate is set to a proportion of the remaining bandwidth according to a function of the queue fill level.

An example of DSP psuedocode is given below:

```
for I in 1 to 4 loop
    RPU_PORT_ALIAS:=I;
    —Calculate AACR
    TACR=TACR_min+TACR_max=total=total_min=
        total_max=0;
    while (RPU_STATUS and RPU_ACR_AVAIL-BIT)
        loop
        if (not RPU_IS_MCR) then
            acr=RPU_ACR;
            if (acr>max_erq*max_erq_sf) then
                TACR_max:=TACR_max+acr;
                total_max+1;
            elsif (acr<(min_erq*min_erq_sf) then
                TACR_min:=TACR_min+acr;
                total_min:-total_min:-total_min+1;
            else
                TACR:=TACR+acr; total:-total+1;
            end if;
    end loop;
    AACR:=(TACR+AACR)/(total+1);
    if (total_max>2) then
        floor(max_erq, (TACR_max/total_max)*(1/1
            max_erq_sf));
    else
        if (total=0) and (total_min>0)) then
            tmp:=(TACR_min/total_min)*(1/min_erq_sf);
            ceiling(min_erq, tmp); vars.AACR:=tmp;
        end if;
    end if;
    —Latch RPU_TIMER, RPU_ABRUBR_QL, etc.
    RPU_TIMER:=0;
    —Calculate ABR input rate
    timer:=RPU-TIMER;
    ql:-RPU_ABRUBR_QL;
    cells_input:=RPU_ABRUBR_COUNT+ql-
        previous_ql;
    cell-periods:=timer-previous_timer;
    rate:=353200*cells_input/cell-periods;
    —Calculate ERQ
    erq:=AACR/(rate/R0); ceiling (erq, R0);
    RPU_ERQ:=erq;
    if ((rate>353200) or (ql>100)) then
        ni:=TRUE;
    else
        ni:=FALSE;
    end if;
    RPU_NI:=ni;
    —Determine min_erq and max_erq
    if (erq<=min_erq) then
        min_erq:=erg;
    elsif (not ni) then
        min_erq:=min_erq+(erq-min_erq)/16.0;
    end if;
    if (erg>=max_erq) then
        max_erq:=erq;
    else
        max-erq:=max_erq+(erg-max_erq)/32.0;
    end if;
    previous_ql; previous_timer:=timer;
end loop;
```

Figure 5:
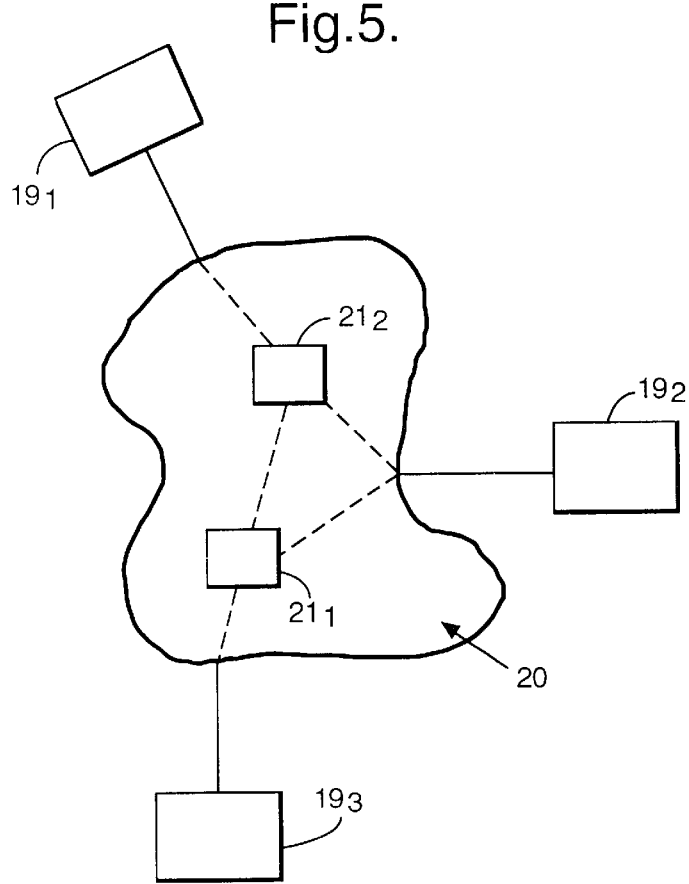

FIG. 5 shows an ATM communication system comprising a number of network sources 19 connected to an ATM network 20 having a number of ATM switches 21. Each of the ATM switches includes a switch fabric provided with a resource management (RM) cell processor in accordance with the present invention.

What is claimed is:

1. A method of generating a bandwidth allocation variable for writing into resource cells by a network element in a cell switched connection system, said network element comprising a switch, said method comprising the steps of:

(a) calculating a cell rate variable which is a function of an aggregate value of bandwidths allocated to active sources connected to said network clement which are directing cell streams to one particular output port of said network element, the bandwidth allocation of the active sources being extracted from said resource cells; and, (b) determining an overload factor for said output port as a function of a rate of input of cells to said output port in relation to a desired rate of input of cells to said output port, wherein said bandwidth allocation variable for each active source is set as said cell rate variable multiplied by said overload factor.

2. A method according to claim 1, in which said cell switched communication system is an asynchronous transfer mode (ATM) network, and where said resource cells are resource management (RM) cells, wherein a modified explicit rate (ER) value ERQ is calculated dynamically by a method comprising the following steps:

(a) determining a cell rate AACR using a mathematical function which takes an aggregate of allowed cell rate (ACR) values sampled from RM cells in one or more streams of ATM cells arriving at the switch ports which are to be routed to said switch output port; and, (b) determining an input rate $R_i$ to an available bit rate (ABR) queue in an output buffer for said switch output port, whereby, $$ERQ = AACR \times \frac{R_t}{R_i}$$

where $R_t$ is a target rate for said switch output port which is less than or equal to a maximum cell rate for said switch output port.

3. A method according to claim 2, in which said target rate $R_t$ is dependent on an output buffer fill level, where a faster target rate is selected when said buffer fill level is below a predetermined level and a slower target rate is selected when said buffer fill level is above a predetermined level.

4. A method according to claim 2, in which a continuous function is used to generate said target rate.

5. A method according to claim 2, in which ERQ values generated by the resource cell processing means are filtered.

6. A network element comprising a switch having a plurality of input ports and output ports for use in a cell switched communication system of the type where network sources generate resource cells containing information relating to a bandwidth allocation for said network sources which may be modified by said network element and passed back to said source to control traffic congestion at said network element, wherein said network element further comprises a computer programmed to generate a bandwidth allocation variable for writing into said resource cells in accordance with a method of generating said bandwidth allocation variable for writing into resource cells by a network element in a cell switched connection system comprising the following steps:

(a) calculating a cell rate variable which is a function of an aggregate value of bandwidths allocated to active sources connected to said network element which are directing cell streams to one particular output port of said network element, the bandwidth allocation of the active sources being extracted from said resource cells; and, (b) determining an overload factor for said output port as a function of a rate of input of cells to said output port in relation to a desired rate of input of cells to said output port, wherein said bandwidth allocation variable for each active source is set as said cell rate variable multiplied by said overload factor.

7. A method of operating a cell switched communication network including a number of network elements according to claim 6 said method comprising the steps of:

(a) detecting a resource cell as it is received at an input port of said network element;

(b) routing said resource cell to a resource cell processing means common to all ports of said network element;

(c) modifying information contained in said resource cell concerning a bandwidth allocation for a source on the basis of a determination of current utilisation of said ports of said network element; and, (d) passing a modified resource cell to an output port of said network element for subsequent return to said source.

* * * * *